C. A. NIEMANN.
MILK STRAINER.
APPLICATION FILED DEC. 20, 1916.
1,224,009.
Patented Apr. 24, 1917.
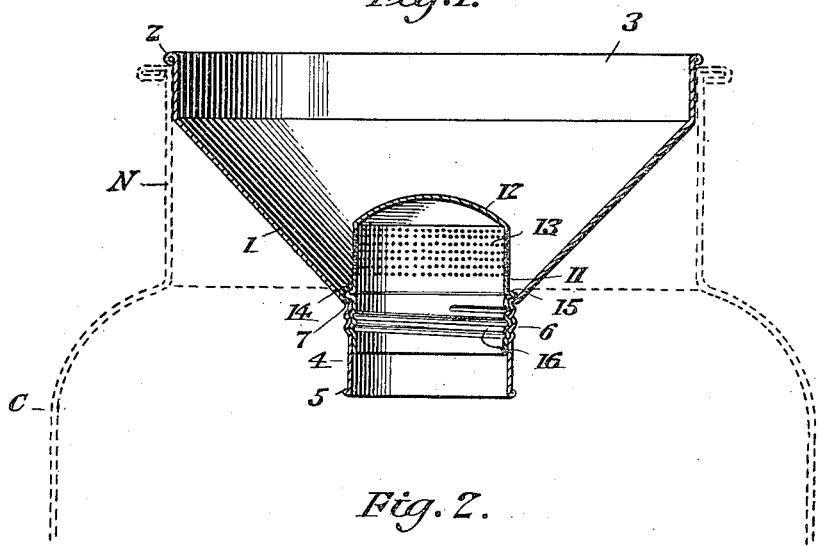
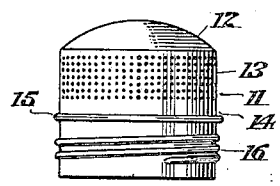
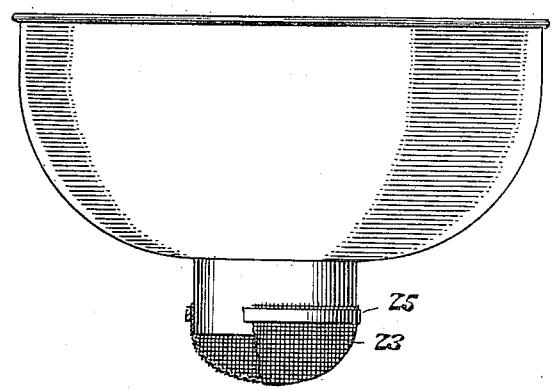
Inventor
C. A. Niemann
Witnesses
By Victor J. Evans
Attorney

UNITED STATES PATENT OFFICE.

CHARLES A. NIEMANN, OF MARCUS, IOWA.

MILK-STRAINER.

1,224,009.   Specification of Letters Patent.   Patented Apr. 24, 1917.

Application filed December 20, 1916. Serial No. 138,024.

*To all whom it may concern:*

Be it known that I, CHARLES A. NIEMANN, a citizen of the United States, residing at Marcus, in the county of Cherokee and State of Iowa, have invented new and and useful Improvements in Milk-Strainers, of which the following is a specification.

This invention has reference to the dairy, and more especially to pails and strainers used therein; and the object of the same is to produce a milk strainer capable of insertion in the mouth of a pail, milk can, or other receptacle, and possessing features of construction whereby it collects the sediment of the milk poured into it and yet does not pass the milk through such sediment in the act of straining it.

The invention is also designed with the purpose of simplifying a strainer of this character, cheapening its cost of manufacture, rendering it more durable than those now in common use, and providing means whereby it may be readily cleansed.

These and other objects are carried out by constructing the strainer in the manner hereinafter more fully described and claimed, and as shown in the drawings wherein—

Figure 1 is a central vertical section through the improved strainer, showing it mounted in the mouth of a milk can which is indicated in dotted lines.

Fig. 2 is an elevation of the straining element itself, removed from the funnel.

Fig. 3 is a side elevation, partly in section, showing a slight modification.

In the drawings I have shown my strainer as made in two parts, viz; a funnel, and a strainer element removably attached thereto. These parts are by preference made entirely of metal, the funnel of block tin or the like and the strainer of sheet metal of a proper gage and stiffness.

The funnel may have a body of desired size and shape but by preference I make it conical or downwardly tapering as shown at 1, with a bead 2 around its mouth 3, which bead rests on the upper end of the neck N of a can C or similar receptacle, or which will rest on the mouth of a milk pail if the latter be of proper size. At the lower end of the body is a spout 4, also preferably beaded at 5 around its lower end, and a flat seat 7 is formed at the juncture of the body with the spout. Below this seat threads 6 are pressed or stamped into such spout in the act of making it.

The strainer element, best seen removed in Fig. 2, comprises a cylindrical body 11 having an imperforate and preferably dome-shaped top 12, a wide band or zone of very fine perforations 13 around the body beneath said top, an imperforate band or zone 14 just beneath the perforations, an outwardly projecting flange 15 just beneath this zone, and beneath the flange in turn a series of threads 16 of a size and pitch to co-act with the threads 6 on the spout 4 of the funnel. This element as a whole may be stamped from a suitable metal or made in any desired way, its details of construction forming no feature of the present invention.

When the two elements are assembled as seen in Fig. 1, the strainer is passed down into the body 1 of the funnel until its lower end enters the junction between said body and the spout 4, and then turned to the right so that the threads 16 engage into the threads 6 in a manner which will be clear. This rotary motion is continued until the flange 15 comes down onto the seat 7 and if the threads are then turned tightly into each other this flange will make a nearly liquid tight contact with the seat. The imperforate zone 14 of the strainer, which is next above the flange 15, now stands within the body of the funnel, whereas the perforate zone 13 is above the imperforate zone. Therefore when milk is poured in to the funnel it strikes the closed top 12 and flows off of the same onto the sides of the body 1, then flows downward and inward against the imperforate zone 14 and, as it acccumulates, rises within the body around the strainer element until it reaches such depth that it surrounds the perforated zone 13. The increasing weight of the milk poured into the funnel, now forces that around the perforated zone 13 through the perforations and into the interior of the strainer, and thence it falls through the latter and into the receptacle beneath, whether such receptacle be the can C as indicated in dotted lines, or a milk pail, or anything else. Thus it will be seen that heavy particles of sediment in the milk fall into the annular angular space between the walls of the body 1 and the imperforated zone 14, and particles strained out of the milk by the perforated zone eventually reach this space also; whereas all milk that is strained passes through the perforated zone above this annular space and therefore does not become contaminated by contact with such particles. Meanwhile little if any milk will leak between the flange 15 and the body 1.

Attention is directed to the fact that the straining action takes place as the milk flows radially inward from all directions toward the axis of the straining element, and whatever is caught or picked up by the sieve throughout its perforated zone 14 will be on the exterior of this element. Therefore when it is desired to wash the parts and the strainer element is removed by unscrewing it from the threads 6, it can be very easily cleansed by applying hot water to its exterior and brushing or wiping the same with suitable implements. In order to be perfectly certain that all particles are removed, the element should be dropped into boiling water for a few moments before it is replaced for further use. Meanwhile the interior of the funnel and of its rather large spout can be readily cleansed with a brush or cloth.

In Fig. 3 I have shown the body of the funnel as of somewhat different shape, but I do not wish to be limited to this shape or to any shape or size of this or the other element. In this view I have shown the use of a supplemental strainer in the shape of a cloth bag 23 passed over the lower end of the spout 4 and held thereon by a metal ring or band 25 as is quite common in milk strainers of this class. Such supplemental strainer may be used in connection with my improved element above described, or not, as desired. While I have described this invention as adapted particularly for milk and for use with milk pails or cans, it is clear that other liquids than milk could be strained by its use, and if so it may be desirable to have the perforations in the sieve or zone 13 of one size and the mesh of the cloth 23 of another.

What is claimed as new is:

1. In a device of the character described, the combination with a funnel including a spout, a flat annular seat around its upper end, and a body connected with the periphery of the seat and increasing in size thence upward; of a strainer having a cylindrical body of a size to closely fit said spout, its top closed, its upper portion having a perforated zone and an imperforate zone just beneath it, an annular flange projecting radially from said body just beneath said imperforate zone and adapted to contact with said seat, and coacting means within the spout and on the body for locking them together when the flange engages said seat, for the purpose set forth.

2. In a device of the character described, the combination with a funnel including a spout, a flat annular seat around its upper end, and a body connected with the periphery of the seat and increasing in size thence upward, said spout having screw threads pressed into it; of a strainer having a cylindrical body of a size to fit said spout, its top closed, its upper portion having a perforated zone and an imperforate zone just beneath it, a flange projecting radially outward just beneath said imperforate zone and adapted to contact with said seat, and threads pressed into the strainer beneath the flange and adapted to engage those within the spout, for the purpose set forth.

In testimony whereof I affix my signature.

CHARLES A. NIEMANN.

Copies of this patent may be obtained for five cents each, by addressing the "Commissioner of Patents, Washington, D. C."